US012587830B2

(12) United States Patent
Shah

(10) Patent No.: US 12,587,830 B2
(45) Date of Patent: Mar. 24, 2026

(54) AUTHORIZED VOICE COMMAND OVERRIDE FOR WIRELESS DEVICE DATA AND EMERGENCY ALERT CAPABILITIES OVER WIFI AND CELLULAR NETWORKS

(71) Applicant: T-Mobile USA, Inc., Bellevue, WA (US)

(72) Inventor: Darshan Shah, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 328 days.

(21) Appl. No.: 17/122,735

(22) Filed: Dec. 15, 2020

(65) Prior Publication Data

US 2022/0191683 A1     Jun. 16, 2022

(51) Int. Cl.
| | |
|---|---|
| *H04W 8/00* | (2009.01) |
| *G10L 15/22* | (2006.01) |
| *H04W 8/22* | (2009.01) |
| *H04W 84/12* | (2009.01) |

(52) U.S. Cl.
CPC .............. *H04W 8/22* (2013.01); *G10L 15/22* (2013.01); *H04W 84/12* (2013.01)

(58) Field of Classification Search
CPC ....... H04W 8/22; H04W 84/12; H04W 88/06; G10L 15/22
See application file for complete search history.

(56) References Cited

U.S. PATENT DOCUMENTS

| | | | | |
|---|---|---|---|---|
| 11,127,405 | B1* | 9/2021 | Antos | ...................... G10L 15/30 |
| 2012/0032945 | A1* | 2/2012 | Dare | ..................... G06F 3/0488 |
| | | | | 345/418 |

| | | | | |
|---|---|---|---|---|
| 2015/0051913 | A1* | 2/2015 | Choi | ....................... H04M 1/67 |
| | | | | 704/273 |
| 2015/0087258 | A1* | 3/2015 | Barnes | .................... H04W 4/90 |
| | | | | 455/404.2 |
| 2015/0245388 | A1* | 8/2015 | Yerrabommanahalli | ................... |
| | | | | H04L 65/1016 |
| | | | | 455/404.1 |
| 2017/0188183 | A1* | 6/2017 | Lihosit | ................ H04W 40/244 |
| 2017/0358300 | A1* | 12/2017 | Laurens | .................. G06F 3/167 |
| 2018/0014189 | A1 | 1/2018 | Ellison et al. | |
| 2018/0247065 | A1* | 8/2018 | Rhee | .................. G06V 40/1365 |
| 2019/0043510 | A1 | 2/2019 | Wang et al. | |
| 2019/0165824 | A1* | 5/2019 | Mohamed | ......... H04M 1/72454 |
| 2021/0256979 | A1 | 8/2021 | Zhang et al. | |
| 2024/0296845 | A1* | 9/2024 | Bates | ..................... G10L 15/22 |

* cited by examiner

*Primary Examiner* — Pakee Fang
(74) *Attorney, Agent, or Firm* — Lee & Hayes, P.C.

(57) ABSTRACT

A wireless device provides voice authorization commands to disable and enable various data capabilities. In some examples, a single voice command from an authorized user disables multiple data capabilities on the wireless device while retaining voice call functionality and other desired device capabilities. Voice authorization commands to disable and enable data capabilities may override the control of the data capabilities, including deactivating and reactivating the corresponding user controls within the settings menu of the wireless device, after which a second associated voice authorization command may be used to re-enable the disabled data capabilities. In various examples, voice commands may be used to enable or disable different types of data capabilities on the wireless devices, including for different device applications and features, and may be authorized by different users with various security and authorization techniques.

17 Claims, 8 Drawing Sheets

200

300

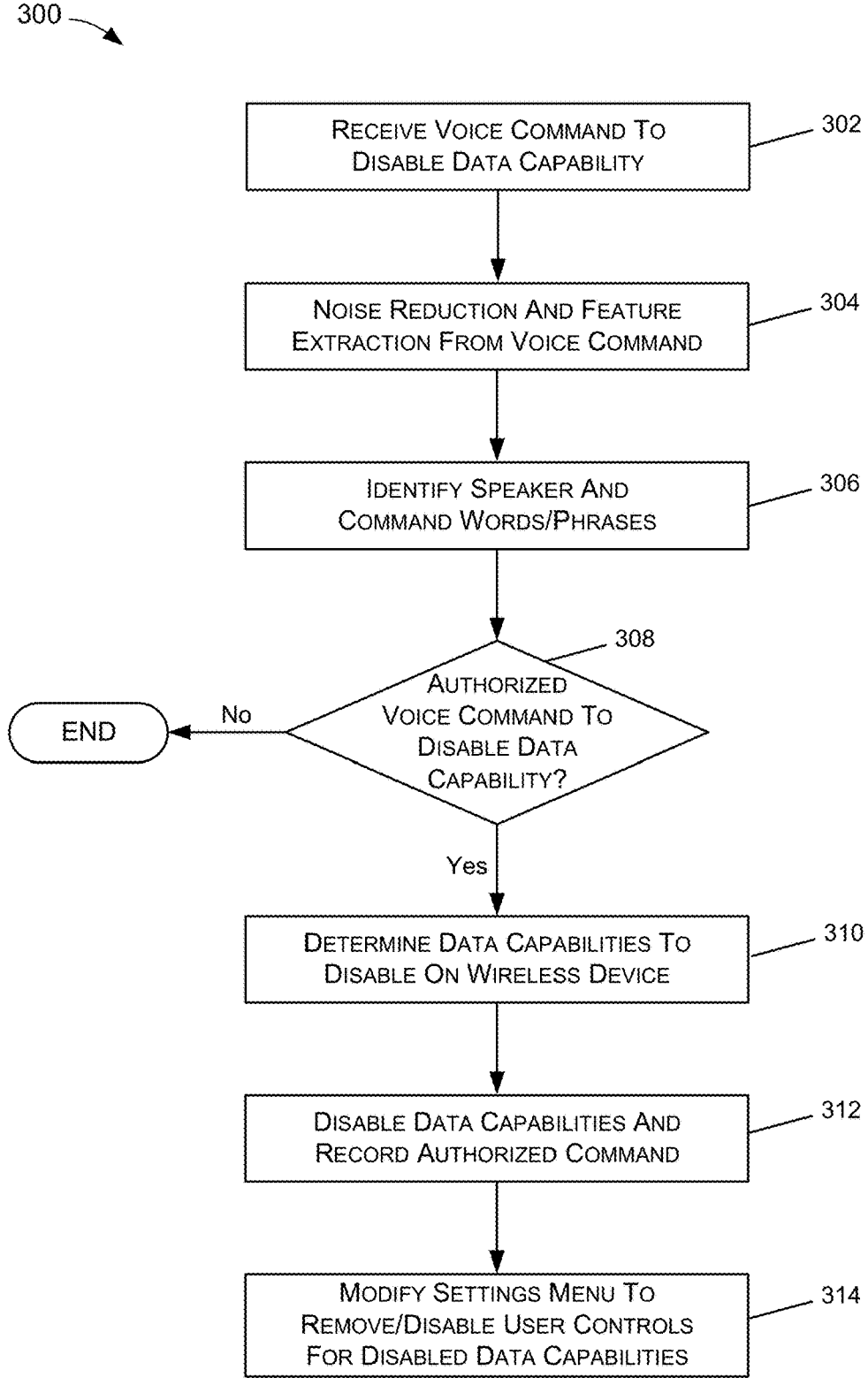

RECEIVE VOICE COMMAND TO
DISABLE DATA CAPABILITY — 302

NOISE REDUCTION AND FEATURE
EXTRACTION FROM VOICE COMMAND — 304

IDENTIFY SPEAKER AND
COMMAND WORDS/PHRASES — 306

AUTHORIZED
VOICE COMMAND TO
DISABLE DATA
CAPABILITY? — 308

No

END

Yes

DETERMINE DATA CAPABILITIES TO
DISABLE ON WIRELESS DEVICE — 310

DISABLE DATA CAPABILITIES AND
RECORD AUTHORIZED COMMAND — 312

MODIFY SETTINGS MENU TO
REMOVE/DISABLE USER CONTROLS
FOR DISABLED DATA CAPABILITIES — 314

FIG. 3

| USER 402 | AUTH COMMAND 404 | ENABLE/DISABLE 406 | WIRELESS DATA TYPE(S) 408 | APPLICATIONS/ FEATURES 410 | SECONDARY AUTH. REQUIRED? 412 |
|---|---|---|---|---|---|
| User 1 | AUTH COMMAND 1 | DISABLE | ALL | ALL | No |
| User 2 | AUTH COMMAND 1 | DISABLE | WIFI, CELL DATA | ALL (MAP, UPDATES) | No |
| User 2 | AUTH COMMAND 2 | ENABLE | CELL DATA | SOCIAL MEDIA | YES |
| User 3 | AUTH COMMAND 3 | ENABLE | ALL | GAMING, VIDEO | No |

DISABLE WIFI CAPABILITIES
ON WIRELESS DEVICE                          502

DISABLE CELLULAR DATA CAPABILITIES FOR
APPLICATIONS/FEATURES ON WIRELESS DEVICE    504

ENABLE/RE-ENABLE VOICE
CALLS ON WIRELESS DEVICE                     506

ENABLE/RE-ENABLE WIRELESS EMERGENCY
ALERTS ON WIRELESS DEVICE                    508

ENABLE/RE-ENABLE SMS AND MMS
MESSAGING ON WIRELESS DEVICE                 510

800 —

WIRELESS DEVICE 110

MEMORY 204

OS 818

DATA CAPABILITIES CONTROL 208

APPLICATIONS/ FEATURES 210

DEVICE SETTINGS MENUS 212

VOICE COMMAND REPOSITORY 220

PROCESSOR(S) 802

REMOVABLE STORAGE 804

NON-REMOVABLE STORAGE 806

INPUT DEVICE(S) 808

OUTPUT DEVICE(S) 810

COMMUNICATION CONNECTION(S) 812

NETWORK(S) 814

OTHER COMPUTING DEVICES 816

AUTHORIZED VOICE COMMAND OVERRIDE FOR WIRELESS DEVICE DATA AND EMERGENCY ALERT CAPABILITIES OVER WIFI AND CELLULAR NETWORKS

BACKGROUND

Wireless devices such as smartphones and virtual assistant devices are often designed and configured to connect automatically to available data networks and to begin transmitting and receiving data. For instance, when a user moves between WiFi and cellular data networks, or when the user arrives at a new location (e.g., an airport or business) and turns on their device, the device may automatically detect any available data networks and may connect automatically to begin supporting any data dependent applications and features executing on the device. Although configuring devices to automatically use data from available data networks may be desirable in some cases, such configurations also may result in problems and vulnerabilities affecting device security, increased network traffic, data usage and roaming, and parental control of devices.

Some wireless devices include a settings menu that allow users to enable and disable certain data capabilities, but settings menus can be challenging to use and imprecise. For instance, many smartphones include an "Airplane Mode" or "Flight Mode" feature, but these features disable not only data capabilities but also voice calls, text messages, Wireless Emergency Alert (WEA) and 911 capabilities, and software updates. In order to disable the data capabilities for device applications and features while retaining voice call capabilities and other desired functionality, many wireless devices require a complex multi-step process that includes disabling WiFi on the device, separately disabling cellular data for one or more applications or features, and/or separately disabling various other data capabilities on the device. Each of these steps may require the user to access a different location within the settings menu, which are often nonintuitive and vary depending on the wireless device type, current operating system version, and device applications and features. As a result, users may lack the technical sophistication to successfully disable data capabilities on their wireless device, while retaining voice call capabilities, WEA and 911 capabilities, software updates, and other desired functionality.

Additionally, many users of wireless devices disable data capabilities for parental control or similar situations, to limit the features and content available to other users sharing the device. For example, a parent may want to disable data capabilities on a smartphone or tablet computer to prevent their child from streaming video, playing video games, or using certain social media applications. However, even when the data capabilities have been disabled on a wireless device, an unsupervised child or other user may re-enable the same data capabilities and/or alternative data capabilities using the settings menus of the device. In many cases, a child may be more familiar with the settings and security features of a wireless device than their parents, allowing the child to easily thwart a parent's attempt to limit the child's device usage and restrict the available content.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 is a flow diagram illustrating a process for disabling one or more data capabilities based on a voice command received at a wireless device, in accordance with certain techniques described herein.

FIG. 4 is a table showing examples of voice command user authorization data associated with disabling and enabling data capabilities on a wireless device, in accordance with certain techniques described herein.

DETAILED DESCRIPTION

Figure 1:
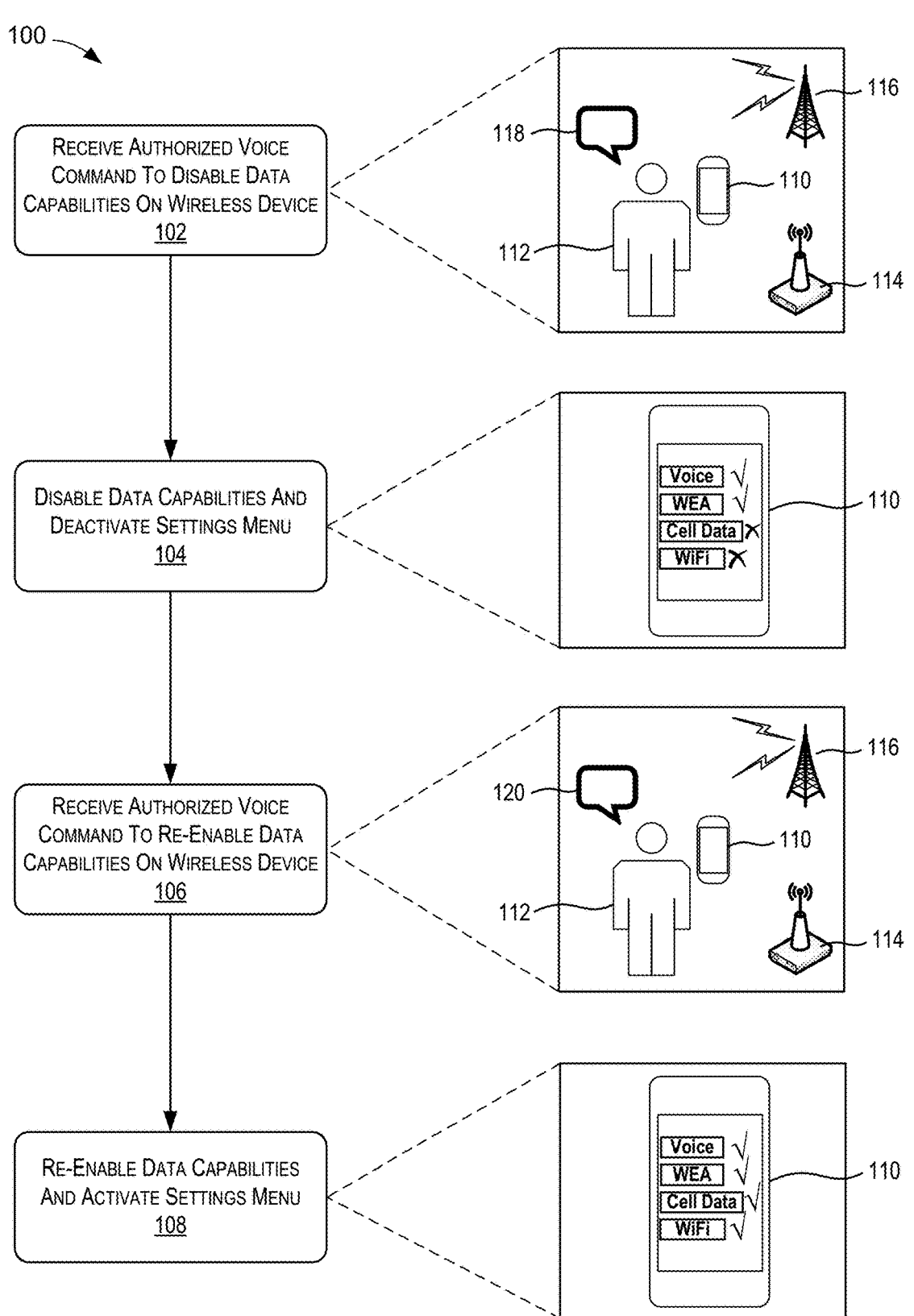
FIG. 1 illustrates a technique for using authorized voice commands to disable and re-enable data capabilities on a wireless device.

This disclosure describes various techniques for using authorized voice commands to disable and enable data capabilities on wireless devices. In some examples, a single voice command from an authorized user may cause the wireless device to disable multiple data capabilities, such as WiFi and cellular data, while retaining voice call functionality and other desired device capabilities. Authorized voice commands to disable data capabilities also may override the control of the data capabilities by disabling the corresponding user controls within the settings menu of the wireless device. Accordingly, after a voice command is used to disable one or more data capabilities on the wireless device, a second associated voice command may be required to re-enable the disabled data capabilities on the device and reactivate the corresponding user controls within the settings menu. In various examples described below, authorized voice commands may be used to enable or disable different data capabilities on the wireless devices, including different network types and different device applications and features, and may be performed by different authorized users including various user authorization and security techniques.

The techniques described herein provide technical improvements in the areas of device security, wireless network security, and network usage management. As noted above, conventional wireless devices may be configured to automatically detect and connect to available wireless networks, resulting in undesirable network connections and data transfers between the wireless devices and unknown and untrusted networks. These connections may result in increased network traffic, excess data usage and network costs incurred by the device, and exposing the device to potential security risks via the unknown and untrusted networks. Additionally, for conventional wireless devices shared between users (e.g., parent-child, employer-employee, etc.), such devices may be vulnerable to a non-authorized user (e.g., a child or employee) accessing the settings menu of the device to re-enable the data capabilities that were previously disabled by the authorized user (e.g., a parent or employer). Thus, in conventional systems, non-authorized users of shared devices may easily thwart parental controls to access restricted features, applications, and content via the wireless device.

In contrast to conventional systems, the techniques described herein provide additional network security for wireless devices, by disabling data capabilities to prevent undesirable connections and data transfers with unknown and untrusted networks. By reliably disabling data capabilities on the wireless device, without disabling voice calls and other network-based functionality, the techniques described herein also improve data efficiency, reducing network traffic and preventing network costs such as excess data and roaming charges for the wireless subscriber. Further, the techniques herein improve parental control and address other vulnerabilities associated with in-person device sharing, by supporting authorized voice commands to disable data capabilities that override the settings menus of the device and prevent re-enabling of the data capabilities by unauthorized users.

FIG. 1 illustrates an example process 100 for using authorized voice commands to disable and re-enable data capabilities on a wireless device. Operations 102-108 represent a process for disabling one or more data capabilities on a wireless device 110 in response to a first voice command from a user 112, and then re-enabling the same data capabilities (or different data capabilities) on the wireless device 110 in response to a second voice command from the user 112 (or a different user).

The wireless device 110 may comprise any type of device capable of wireless communication with other external networks, computing devices, and/or servers via wireless networks interfaces and/or radio components. In various examples, wireless device 110 may comprise a mobile phone, a virtual assistant device, a home automation device, a vehicle-based computing device, a tablet computer, a smart watch or other wearable computing device, an Internet-of-Things (IoT) device, or any other electronic device capable transmitting or receiving wireless data.

At operation 102, an authorized user 112 speaks a command to disable data capabilities on the wireless device 110. As shown in this example, at the time the command is spoken in operation 102 the wireless device 110 is connected to a wireless access point 114 providing access to one or more WiFi-based networks. The wireless device 110 is also within range of a cellular base station 116 providing access to a radio access network (RAN) of a mobile network 100 capable of providing data and voice services to subscribers. In this example, the user 112 speaks a voice command 118 to disable one or more data capabilities of the wireless device 110. The voice command 118 is received and processed via a microphone and audio input interface of the wireless device 110. As discussed in more detail below, the wireless device 110 may support various different types of voice commands, from a single user or multiple users, corresponding to different combinations of data capabilities to be disabled or enabled. Additionally, the wireless device 110 may analyze the audio features of voice command 118, identify the user 112 speaking the command, and verify that the user 112 is authorized to disable (or enable) the data capabilities of the wireless device 110.

At operation 104, the wireless device 110 disables certain data capabilities in response to the voice command 118 from the user 112 in operation 102. As shown in this example, the wireless device 110 has disabled its WiFi capabilities and its cellular data capabilities in response to receiving the authorized voice command 118. Accordingly, at operation 104 the wireless device 110 is configured not to support connections to the wireless access point 114 or any other WiFi connection. Additionally, the wireless device 110 at operation 104 has been configured not to send or receive data via the cellular connection with cellular base station 116 or any other base stations in the mobile network. However, as shown in this example, the wireless device 110 has been configured to enable (or retain) voice call capabilities and WEA capabilities during the same time period when the WiFi and cellular data capabilities are disabled.

Additionally, in operation 104 the wireless device 110 may disable the user interface controls within the settings menu of the wireless device 110 that correspond to the disabled data capabilities. For instance, in this example the wireless device 110 may disable a first user interface control that allows users to toggle the WiFi on or off, and a second user interface control that allows users to toggle the cellular data usage on or off for the wireless device 110.

At operation 106, the user 112 speaks a second voice command 120 to re-enable the data capabilities of the wireless device 110. Using similar or identical techniques to those in operation 102, the wireless device 110 receives and processes the second voice command 120 in operation 106, via the microphone and audio input interface of the wireless device 110. The wireless device 110 may analyze the second voice command 120 to identify the speaker and/or the spoken words or phrases of the second voice command 120. Based on the identified speaker and/or the spoken words or phrases, the wireless device 110 may determine that the second voice command 120 corresponds to a request to enable (or re-enable) certain data capabilities, and that the user 112 that spoke the second voice command 120 is authorized to enable those data capabilities. In this example, the second voice command 120 may re-enable the same data capabilities (e.g., WiFi and cellular data) that were disabled in operation 104. In various other examples, voice commands from authorized users may be used to enable or disable different combinations of data capabilities on the device. Additionally, in some cases the wireless device 110 may verify that the same user 112 that spoke the first voice command 118 to disable the data capabilities also spoke the first voice command 118 to re-enable the data capabilities, while in other examples different users may disable and re-enable the same data capabilities on the same wireless device 110.

At operation 108, the wireless device 110 re-enables the data capabilities in response to the second voice command 120 received in operation 104. As shown in this example, the wireless device 110 has re-enabled its WiFi capabilities and its cellular data capabilities in response to receiving the second authorized voice command 120. As before, the wireless device 110 also has been configured retain its voice call capabilities and WEA capabilities. Additionally, in operation 108 the wireless device 110 may re-enable the user interface controls in its settings menus corresponding to the re-enabled data capabilities. For instance, in this example the wireless device 110 may re-enable the user interface control allowing users to toggle the WiFi on or off, and the user interface control allowing users to toggle the cellular data usage on or off for the wireless device 110.

As illustrated by this example, the techniques described herein may be implemented within a wireless device 100 to allow an authorized user to disable multiple data capabilities using a single voice command. In response to the authorized voice command, the wireless device 100 disables a particular set of data capabilities to improve the network usage, device security, or parental control, while retaining other desired wireless capabilities such as voice calls, WEA capabilities, software updates, etc. Additionally, the authorized voice command may override control of the disabled data capabilities on the wireless device 100 by disabling the corresponding user interface controls in the settings menu of the wireless device 100, to prevent unauthorized users from re-enabling the data capabilities disabled by authorized users.

Figure 2:
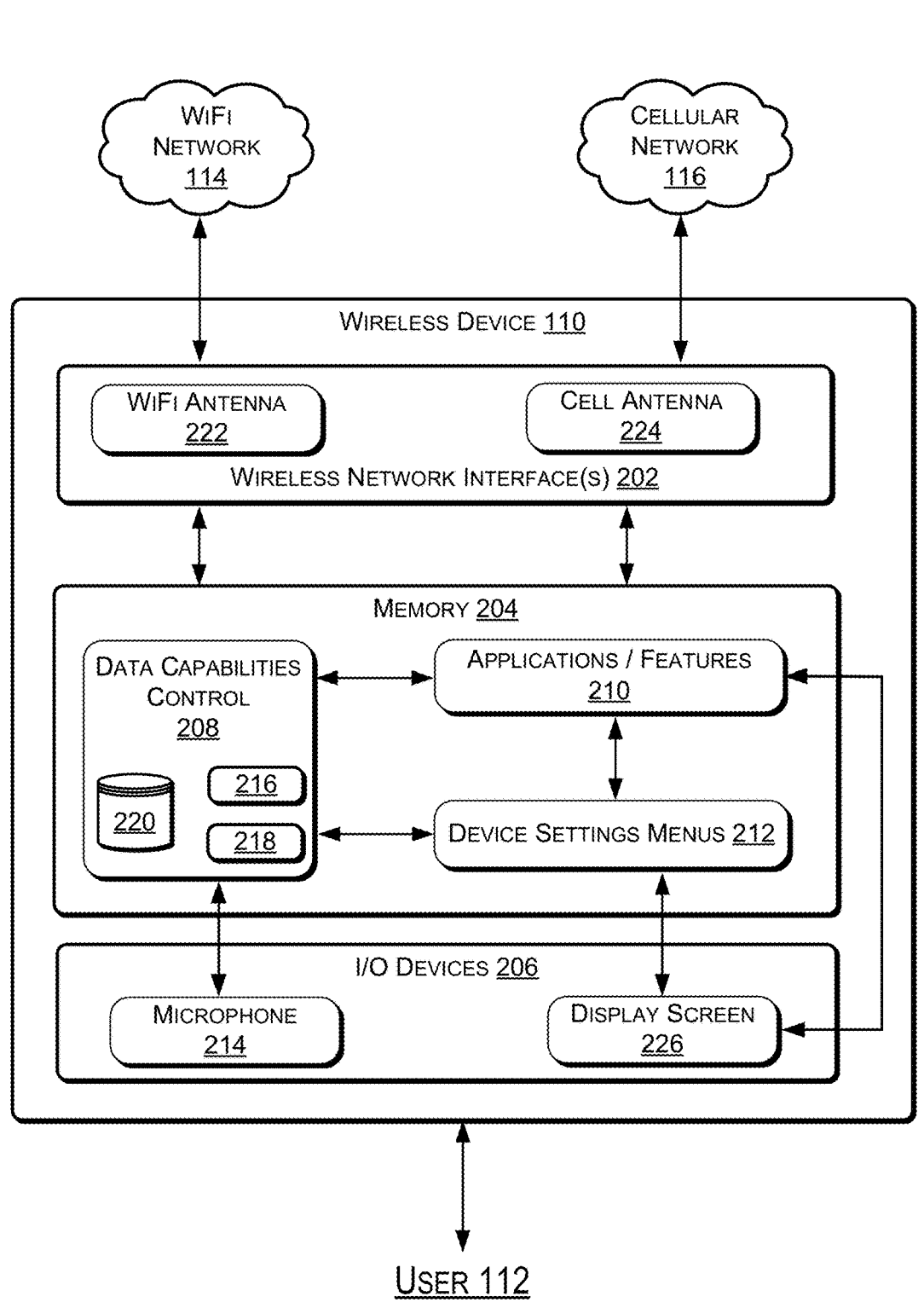
FIG. 2 illustrates a computing system with a wireless device including a voice command-based data capabilities control component, in accordance with certain techniques described herein.

FIG. 2 depicts a computing system 200 including wireless device 110 configured to support voice command-based disabling or re-enabling of data capabilities. The wireless device 110 in this example may be similar or identical to the wireless device 110 discussed above in reference to FIG. 1. In various implementations, the wireless device 110 may be a smartphone, virtual assistant device, home automation device, etc. The wireless device 110 also may include voice activation functionality in some examples.

As depicted in FIG. 1, wireless device 110 includes wireless network interface(s) 202 with one or more antennas and/or transceivers to support two-way wireless transmissions over various wireless networks, including WiFi network(s) 114 and cellular network(s) 116. Wireless device 110 also includes at least one memory 204 storing software components to perform the functionalities of the voice command-based data capability control techniques described herein. Additionally, the wireless device 110 includes I/O devices 206 for receiving inputs from and outputting data to a user 112 of the wireless device 100.

As noted above, techniques described herein include receiving voice commands from authorized users to disable and enable certain data capabilities on the wireless device, and vice versa, while leaving other network-based capabilities enabled. In this example, a data capabilities control component 208 (or data controller 208) executing in the memory 204 of the wireless device 100 may analyze voice commands and disable/re-enable various data capabilities by coordinating with the various applications and features 210 and the device settings menus 212 of the wireless device 110. The data controller 208 may receive voice commands to enable/disable data capabilities, via a microphone 214 and/or audio input interface components. The data controller 208 may process and analyze the voice command to determine which data capabilities to enable and/or disable, and to verify that the user 112 is authorized to enable or disable the particular data capabilities.

As shown in FIG. 2, the data controller 208 includes various software-based subcomponents, including a speaker recognition component 216 and a command recognition component 218, which may be implemented separately or combined. The speaker recognition component 216 and a command recognition component 218 may be speaker dependent or speaker independent components in various examples, and may or may not be trained based on the specific voice(s) of user(s) 112. In some cases, the data controller 208 may receive voice command data via the microphone 214, and may use subcomponents 216 and/or 218 to perform speech recognition techniques including data acquisition, feature extraction, feature pattern recognition, and speaker modeling. Using such techniques, the data controller 208 may compare the received voice command data with speech/voice command data stored in a voice command repository 220, in order to identify the speaker and/or determine the voice command for disabling/enabling data capabilities.

To enable and/or disable various data capabilities, the data controller 208 may transmit instructions to specific applications and/or features 210 of the wireless device 110, to configure the various applications and features to use or not use data from various wireless networks or sources as desired. In some cases, the data controller 208 may enable and/or disable data capabilities by transmitting instructions to an application management layer and/or device management layer within the architecture of the wireless device 110, instead of or in addition to communicating directing with the applications and features 210.

Additionally or alternatively, the data controller 208 may communicate directly with the wireless network interface 202 layer of the wireless device architecture to enable and/or disable various data capabilities. In this example, the wireless network interface 202 includes a WiFi antenna 222 and an internal cellular antenna 224. Although not depicted in this example, the wireless network interface 202 layer of the wireless device 110 may include additional antennas, such as a Bluetooth antenna, a GPS antenna, and/or an NFC antenna, and associated network interface components. In some examples, the wireless network interface 202 may include a primary cellular antenna and/or a separate secondary cellular antenna, along with the associated interface components. Additionally, WiFi antenna 222 may include one or more antennas for supporting 3G, 4G, LTE, and/or 5G services, which may be implemented within a single WiFi antenna 222 or within multiple antennas in any combination.

As part of the process of disabling data capabilities on the wireless device 110, the data controller 208 also may modify one or more device settings menus 212 to disable (or remove or obscure) the user interface controls within the settings menu 212 associated with the disabled data capabilities. For instance, the data controller 208 may transmit instructions to the device settings menus 212 to disable the particular user interface controls that allow users to enable WiFi, cellular data, and/or any other disabled data capabilities. When a user interface control has been disabled, the settings menu 212 may freeze and render the control as grayed-out, or remove the control from the user interface, so that any user 112 of the wireless device may be unable to view and/or manipulate the user control via the display screen 226 (e.g., touch screen) to re-enable the data capabilities. Therefore, by disabling the user interface controls for the associated data capabilities, the data controller 208 may prevent unauthorized users from using the display screen 226 to re-enable the data capabilities that were disabled via the authorized voice command.

Although the data controller 208 depicted as a standalone software component, in some implementations the data controller 208 may be implemented within (or associated with) a preexisting software architecture for voice activation and control of the wireless device 110. For instance, a general-purpose voice activation and control component (not shown) may receive, analyze, and authorize voice commands received via the microphone 214, and may direct any of the voice commands related to disabling/enabling data capabilities to the data controller 208, while other voice commands are directed to separate components.

FIG. 3 is a flow diagram illustrating an example process 300 of disabling one or more data capabilities on a wireless device, based on an authorized voice command received at the wireless device. As described below, the operations described in connection with process 300 may be performed by a wireless device 110 including an audio source input (e.g., microphone 214), and which is configured to receive and transmit wireless data via one or more wireless network components (e.g., WiFi antenna 222 and internal cellular antenna 224). As described in this example, the operations of process 300 may be performed by a software-based data controller 208 executing within the memory 204 of the wireless device 110, in conjunction with one or more application/features 210, and the device settings menus 212 of the wireless device. In other examples, the operations described in process 300 may be performed within individual network interfaces and/or mobile applications executing on the wireless device 110, and/or other combinations of computing devices and components described herein.

At operation 302, the data controller 208 receives a voice command to disable one or more data capabilities on the wireless device 110. The voice command may be received via the microphone 214 and/or any other audio inputs to the wireless device 110, including from the user 112 in an immediate proximity of the wireless device 110 or from a remote user (e.g., via a phone or video connection). As discussed in more detail below, the voice commands received in operation 302 may correspond to one or more of various different types, formats, and patterns of voice commands to disable data capabilities on the wireless device 110. In some examples, the voice command may be limited to a single word or a few short words (e.g., "Disable," "Disable Data," "Disable All Data," etc.), which may represent a request to disable all of the data capabilities or a predetermined default set of data capabilities on the wireless device 110.

In other examples, the voice command received at operation 302 may specify additional data relating to the disable data request. For instance, the voice command may identify individual features or applications on the wireless device 100 to which the disable data request applies. As an example, a voice command may request that data capabilities be disabled on the wireless device for any specific mobile application(s) or other device features, (e.g., "Disable data for 'YOUTUBE®,' 'NETFLIX®,' 'WHATSAPP®,' 'FACEBOOK®,' or 'GOOGLE MAPS®,' etc."), or may include a general description of the applications and/or features for which data is to be disabled (e.g., "Disable data for 'all video streaming apps,' 'all gaming apps,' 'social media,' 'email and messaging features,' 'web browsing,' etc."). In some cases, the voice command received at operation 302 also may include an indication of the time or duration for which the data capabilities are to be disabled on the wireless device 100. For instance, a voice command may request that one or more data capabilities be disabled for "X minutes," "Y hours," or "Z days," etc. The voice command also may specify that the data capabilities be disabled until a particular event occurs (e.g., "the end of the day," "school is over," "we get back home," etc.), the occurrence of which may be monitored and verified by the wireless device 110 using various sensors (e.g., clock, GPS, access to various application data, etc.).

In some examples, the voice command received in operation 302 may include authorization-related data, such as the user's password, passcode, or a key phrase that the data controller 208 may verify to determine that the voice command is a valid and authentic command from an authorized user. Additionally or alternatively, the voice command may specify one or more other users that are authorized to re-enable the data capabilities that are being disabled with the current voice command. For instance, the voice command may indicate that the disabled data capabilities can be re-enabled only by that same user, or may specify one or more other users (e.g., "me or Bill," "your parents or teacher," "a senior manager," etc.) that are authorized to re-enable the data capabilities on the wireless device 110.

At operation 304, the data controller 208 may process the voice command received at operation 302 using various speech recognition and/or speaker recognition techniques. In some cases, such techniques may be implemented within the speaker recognition component 216 and/or the command recognition component 218. Such techniques may be optional in some examples, although as shown in this example the data controller 208 may execute a noise reduction process and a feature extraction process at operation 304, to convert the voice command into a format where it can be analyzed and compared to voice command data (e.g., voiceprints) in the voice command repository 220. In various implementations, the data controller 208 may perform one or more noise reduction techniques, including but not limited to Kalman filtering, adaptive Wiener filtering, spectral subtraction, blind equalization, Cepstral mean subtraction, and/or adaptive LMS filtering. The data controller 208 also may perform one or more feature extraction techniques in order to identify observable and discriminative features within the acoustic data of the voice command. The feature extraction process may output a set of feature vectors using various techniques such as Mel-frequency Cepstral Coefficients (MFCC), Perception Linear Prediction (PLP), Linear Prediction Coefficient (LPC), Linear Discriminant Analysis (LDA), Dynamic Time Warping (DTW), and Wavelet.

At operation 306, the data controller 208 may identify the speaker and/or the specific words or phrases of the voice command received at operation 302. In some examples, the data controller 208 may perform voice recognition techniques to convert the spoken voice commands into text. The text of the voice command may be parsed and analyzed to determine the scope and specifics of the request to disable the data capabilities on the wireless device 110. As discussed above, the text of the voice command may include an instruction to disable data capabilities on the wireless device 110, an enumeration of specific device features and/or applications for which data is to be disabled, an indication of the type(s) of data service to be disabled (e.g., WiFi, cellular data, Bluetooth, etc.), a time frame or time window for disabling the data capabilities, authorization data, etc.

In some examples, operation 306 also may include speaker recognition techniques performed by the data controller 208 to determine whether the voice command received at operation 302 was spoken by a known and authorized user (e.g., user 112) of the wireless device 110. For instance, a speaker recognition component 216 may determine the speech and/or voice characteristics based on the voice command, including spectral measurements, vocal tract characteristics, voice source characteristics, etc. To identify and/or verify the speaker of the voice command, the speaker recognition component 216 may analyzed and compare one or more utterances from the voice command with previously stored speech models for known and authorized speakers associated with the wireless device 110. Speech models for known authorized speakers may be stored in the voice command repository 220 and/or in a separate repository external to the wireless device 100. If the characteristics of previously stored speech model associated with a user 112 sufficiently match the speech characteristics of the utterances analyzed within the voice command (e.g., greater than a speech characteristic matching threshold), the data controller 208 may determine that that user 112 is the speaker of the voice command. In contrast, if the speech characteristics of the voice command do not match (e.g., less than a speech matching threshold) an existing speech model for any known user of the wireless device 110, the data controller 208 may determine that the voice command is associated with an unknown speaker.

In the examples above, the data controller 208 may analyze the voice command to determine both the spoken words within the voice command, and the speaker of the voice command. In these examples, the data controller 208 may use the identity of the speaker to retrieve the speaker's credentials on the wireless device 110, and to determine whether or not the speaker is authorized to disable the data capabilities requested by the voice command.

However, in other examples the data controller 208 may be configured not to identify the speaker of the voice command, or may attempt to but is unable to successfully identify the speaker. In such examples, the data controller 208 may use various other techniques to determine the identity of the speaker and verify that the speaker is authorized to disable the data capabilities of the wireless device 110. For instance, the voice command received in operation 302 may include a spoken authorization code (e.g., passcode, password, key phrase, etc.). In such cases, the data controller 208 may detect and recognize the spoken authorization code using speech recognitions techniques, and compare the authorization code to a secure (e.g., encrypted) library of authorization codes in the voice command repository 220 or other memory of the wireless device 110, to determine whether or not the voice command is from an authorized user 112. Additionally or alternatively, the data controller 208 may perform one or more other user authorization techniques using the features of the wireless device 110, such as a password or passcode entered via a touchscreen or keypad, fingerprint verification, retina or iris scanning, facial recognition, etc., to identify and verify the user 112 associated with the voice command.

At operation 308, the data controller 208 determines whether or not the voice command received at operation 302 is an authorized voice command to disable data capabilities. As noted above, the speaker/user associated with the voice command, and well as the text/characteristics of the request within the voice command may be determined at operation 304. In some examples, the data controller 208 may access permissions data within the voice command repository 220 or other memory to determine whether the speaker/user identified in operation 306 is authorized to disable the requested data capabilities. For instance, the voice command repository 220 (or separate secure memory) may store permissions data that associates different users 112 with different levels of control to disable/enable the data capabilities on the wireless device 110. In some cases, certain device users 112 (e.g., a device owner or primary user, administrator, parent, supervisor, etc.) may be authorized to disable/enable any and all data capabilities on the wireless device 110 at any time, while other device users are not authorized. In other examples, the data controller 208 may implement more granular control over the disabling and enabling of data capabilities, in which certain users 112 may be authorized to disable and/or enable specific data capabilities (e.g., particular wireless protocols/networks, particular applications/features, at particular locations, during particular time windows, etc.).

For instance, referring briefly to FIG. 4, a table 400 is shown including example user authorization data for voice commands for disabling and enabling data capabilities on a wireless device 100. The data depicted in example table 400 may represent user permissions/credentials that may be stored within the voice command repository 220 or elsewhere on the wireless device 100, and used by the data controller 208 in operation 308 to determine whether or not a voice command to disable data capabilities is authorized.

In this example, table 400 is organized so manner that each row corresponds to a different voice command from an authorized user to enable or disable data capabilities on the wireless device 110. For each authorized voice command, table 400 includes a user 402, an authorization command 404, the command type 406 (e.g., disable or enable data capabilities), the wireless data type(s) 408 (e.g., wireless antennas, networks, and/or protocols to be enabled or disabled, the applications/features 410 (e.g., data defining a set of applications and/or features on the wireless device 110 for which data capabilities are to be enabled or disabled), and whether the command requires a secondary authorization command from the user 412 (e.g., a passcode, biometric verification, etc.). In this example, parentheticals within the applications/features column 410 may indicate exceptions to the data capabilities indicated outside of the parenthesis. For instance, the data disable command for User 2 in this example may represent a command to disable all WiFi and cellular data capabilities on the wireless device 110, except when using the map feature and for performing operating system updates on the device.

As noted above, each row table 400 may correspond to a different voice command from an authorized user to enable or disable data capabilities. Accordingly, as this example illustrates, a single user may have different predefined voice commands for enabling and/or disabling different data capabilities (e.g., different combinations of applications and features, different wireless data types, etc.). Although not shown in this example, different voice commands also may be associated with different time windows and/or different locations of the wireless device 110. As shown in table 400, different voice commands associated with the same user may have different authorization codes (e.g., passwords, passcodes, key phrases, etc.), and may have different requirements for a secondary authorization.

It should be understood that the structure and organization of voice command authorization data in table 400 is illustrative, and that other data structures, data relationships, and data organizations may be used in other implementations. In some examples, the data controller 208 may maintain authorization data that includes a user identifier field and an authorization command field, potentially without any other data fields shown in table 400 or described above. In such examples, the verification of an authorized user may be sufficient to permit the user to enable or disable any and all data capabilities on the device. An authorization command field 404 also may be optional in some cases, for instance, when the data controller 208 uses speaker recognition techniques rather than a password, key phrase, etc., to verify the identity of authorized user 112.

Returning to FIG. 3, when the data controller 208 determines at operation 308 that the speaker and/or current user 112 is not authorized to disable the requested data capabilities (308:No), process 300 may be terminated and no data capabilities are disabled on the wireless device 110. In some examples, the data controller 208 may initiate a voice response, notification, or visual user interface to request additional authorization from the current user (e.g., a password or key phrase) or to indicate that a different user 112 is required to authorize the disabling of the data capabilities.

In contrast, when the data controller 208 determines at operation 308 that the speaker and/or current user 112 is authorized to disable the requested data capabilities (308: Yes), process 300 may proceed to operation 310 in which the data controller 208 disables the requested data capabilities on the wireless device 110.

At operation 310, after determining that the voice command received at operation 302 is an authorized command to disable data capabilities on the wireless device 110, the data controller 208 disables the one or more data capabilities associated with the voice command. In order to disable the data capabilities, the data controller 208 may invoke one or more APIs and/or other internal functions on the wireless device 110, including functions of an application management interface, device management interface, and/or network management interface. As noted above, the functionality for disabling and enabling various data capabilities may be different on different wireless devices 110 depending on the device types, current operating system version, peripheral devices, and the various applications and/or features installed on the device. Accordingly, the programmatic functionality within the data controller 208 for enabling and disabling various data capabilities may depend on the type, operating system, features, and applications of the wireless device 110. In some instances, the data controller 208 may invoke an API associated with the wireless network interface 202 to disable data capabilities for a specific antenna, wireless network and/or protocol. Additionally or alternatively, the data controller 208 may invoke an API associated with management and usage of the applications and features installed on the wireless device 110, to disable the appropriate data capabilities for the specified applications and features.

Additionally, operation 310 may include multiple different API invocations, function calls, or operations, to disable multiple different types of data capabilities in response to a single voice command. As an example, the wireless device 110 may support one interface or library to enable/disable mobile operation system software updates from occurring on the device, and a separate interface or library to enable/disable cellular data for specific applications installed on the device, and in operation 310 the data controller 208 may invoke both of the separate interfaces/libraries to disable both data capabilities on the wireless device 110.

Figure 5:
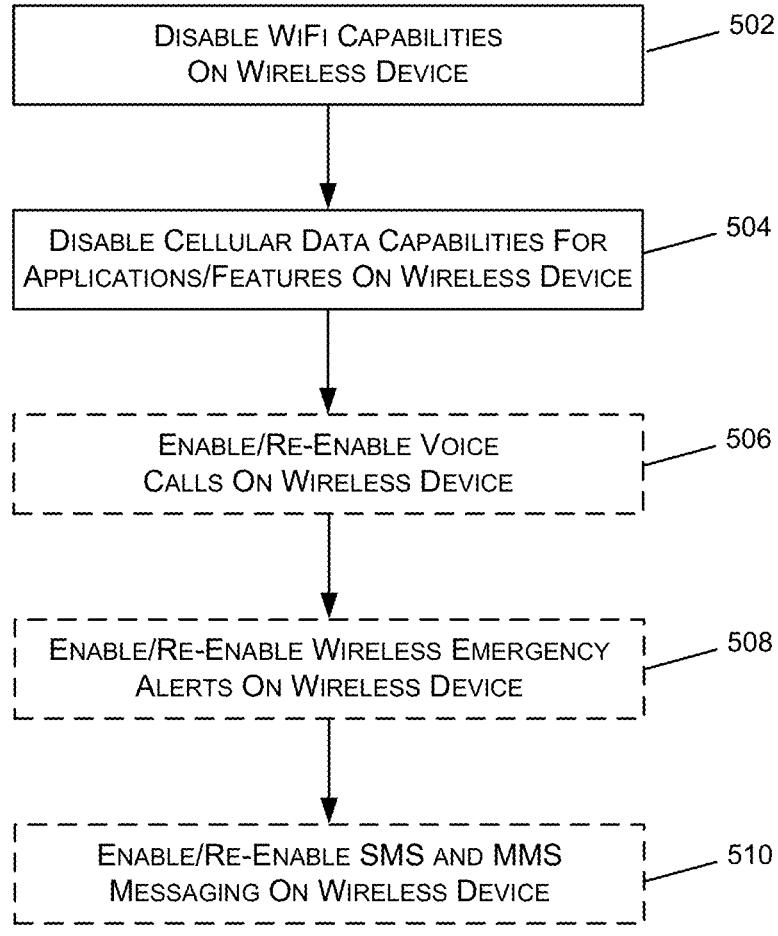
FIG. 5 is a flow diagram illustrating a process for disabling certain data capabilities and enabling additional data and/or network capabilities on a wireless device, in accordance with certain techniques described herein.

Referring briefly to FIG. 5, another flow diagram is shown illustrating a process 500 for disabling a set of data capabilities, and enabling an additional set of data and/or network capabilities, in response to an authorized voice command. Process 500 represents an example set of operations that the data controller 208 may perform during operation 310, in response an authorized voice command to disable data on the wireless device 110. In this example, at operation 502 the data controller 208 invokes one or more internal interfaces or functions to disable WiFi capabilities on the wireless device 110. At operation 504, the data controller 208 invokes one or more additional internal interfaces or functions to disable cellular data capabilities on the wireless device 110. As noted above, the interfaces or functions invoked on the wireless device 110 in operations 502 and 504 may be device specific, operating system specific, and application specific.

In some examples, operation 310 may include a sequence of operations performed by the data controller 208, including a first operation that disables a group of data capabilities followed by a second operation that re-enables a subset of the capabilities in the group. For instance, in example process 500, the data controller 208 may perform (optional)

operations 506-510 to re-enable or confirm additional data-related and/or network-related capabilities, to ensure that the wireless device 110 retains a desired set of data and network capabilities at the same time that other data capabilities are disabled. In this example, process 500 is designed and executed by the data controller 208 to ensure that the WiFi capabilities and cellular data capabilities are disabled (operations 502-504) while that certain additional capabilities remain available on the wireless device 110 (operations 506-510). At operation 506, the data controller 208 invokes one or more internal interfaces or functions to enable (or re-enable, confirm operation of, etc.) the voice call capabilities on the wireless device 110. At operation 508, the data controller 208 invokes one or more internal interfaces or functions to enable WEA alerts on the wireless device 110. At operation 510, the data controller 208 invokes one or more internal interfaces or functions to enable SMS and MMS messaging capabilities on the wireless device 110. Thus, in this example, the data controller 208 performs operations 502 and 504 to disable all WiFi and cellular data capabilities, and then performed operations 506-510 to re-enable and/or confirm operation of voice call capabilities (e.g., including both cellular and WiFi-based voice calls), WEA alerts, and SMS/MMS messaging. Like operations 502-504, operations 506-510 also may be performed by the data controller 208 by invoking internal interfaces and/or functions on the wireless device 110, to enable and/or verify availability of the desired data capabilities.

As noted above, operations 506-510 may be unnecessary and/or may be optional performed in some implementations. For instance, in some cases the data controller 208 may determine that disabling a desired set of data capabilities does not disable or otherwise affect any other data capabilities on the wireless device 110. In this example, if the operations performed to disable WiFi and cellular data capabilities do not also disable voice call capabilities, WEA alerts, and SMS/MMS messaging, then operations 506-510 may be unnecessary. However, if the data controller 208 determines that performing the operations to disable the desired set of data capabilities for the voice command also disables additional data capabilities that should not to be disabled, the data controller 208 may determine and perform additional operations to re-enable or confirm that the additional data capabilities are enabled. For instance, if a voice command from an authorized user corresponds to a request to disable cellular data for all applications/features on the wireless device 110, except for a certain enumerated applications/features, the data controller 208 in operation 310 may perform a first operation to disable all cellular data capabilities on the wireless device 110, and then subsequent operations to re-enable cellular data for the enumerated applications/features. In some cases, such techniques may be more computationally efficient and may provide greater accuracy and granularity then performing separate operations to disable each individual application/feature on the wireless device 110.

As illustrated by this example, in operation 310 the data controller 208 may perform multiple operations to disable multiple different data capabilities on the wireless device 110 in response to a single voice command spoken by an authorized user 112. Additionally, as this example shows, in operation 310 the data controller 208 also may be configured to re-enable, retain, and/or confirm availability of other data capabilities on the wireless device 110 as necessary, at the same time when the desired data capabilities are disabled. These techniques thus provide a more efficient and reliable interface for an authorized user 112 to disable a specific sets of data capabilities on the wireless device 110, while retaining other data capabilities, in which the user can initiate a complex sequence of operations to disable/enable data capabilities with a single voice command, and need not navigate any of the settings menus on the wireless device 110 to configure the data capabilities. Additionally, although the operations in process 500 describe a specific example of disabling WiFi and cellular data while retaining voice call capabilities, WEA alerts, and SMS/MMS messaging, it should be understood that in other examples operation 310 may disable any desired set of data capabilities on the wireless device 110 while enabling or retaining other data capabilities.

Continuing with operation 310, in addition to the data controller 208 disabling and/or enabling determined sets of data capabilities, the data controller 208 also may log or otherwise record data associated with the authorized voice command. For example, the data controller 208 may store log data in the voice command repository 220, or elsewhere within the memory 204 of the wireless device 110 or within an external memory, indicating the voice command received at operation 302, the speaker/user 112 associated with the voice command, the time associated with the voice command, the location of the wireless device 110 at when the voice command was received, etc. The data controller 208 also may log or otherwise record the data capabilities that were disabled (and/or enabled) in operation 310.

As described in more detail below, the data controller 208 may enforce requirements for particular users 112 and/or particular voice commands to disable data, that specify which users can re-enable the data capabilities disabled by the particular users and voice commands. To illustrate, in some cases a user 112 may be authorized to enable or disable data capabilities on the wireless device 110 at all times and in all circumstances. In other cases, when a first authorized user 112 disables data capabilities on the wireless device 100, those the data capabilities may be re-enabled only by the first authorized user 112 and/or by other associated users that have been expressly granted permissions to re-enable the data capabilities disabled by the first authorized user 112. For instance, in a parental control context, a parent may disable data capabilities using a voice command that only he/she can re-enable. In another example, the parent may use a different voice command (e.g., specifying one or more other authorized users) that disables data capabilities while authorizing one or more other users (e.g., other parents, teachers, etc.) to re-enable the data capabilities. Associations between different authorized users 112 to disable and enable data capabilities on the wireless device 110 may be defined at the user-level or may be voice command-specific, and also may include time-based and location-based criteria. Accordingly, by logging or otherwise recording data in operation 310 associated with the authorized user and the voice command, the data controller 208 may use the data in subsequent operations to determine whether a command to re-enable data capabilities is authorized.

At operation 312, the data controller 208 may modify the device settings menus 212 of the wireless device 110 to remove and/or disable the user controls within the settings menus associated with any data capabilities disabled in operation 310. For example, for each data capability disabled in operation 310, the data controller 208 may invoke an internal interface or function provided by the device settings menus 212 to disable (e.g., gray out) or remove the corresponding user interface control within the device settings menus 212. For instance, if operation 310 included disabling the WiFi and cellular data for "Application 1,"

then in operation 312 the data controller 208 may invoke an internal interface or function to disable the user interface control that allows device users to toggle (e.g., enable and disable) WiFi and cellular data usage for Application 1. Removing and/or disabling the user controls in operation 312 may include determining and invoking the interfaces or functions that correspond to data capabilities disabled in operation 310. In various examples, the interfaces or functions may include application-specific settings menus, and/or device-level data usage menus, network settings menus, etc. As noted above, by removing or disabling the associated user controls with the device settings menus 212, the data controller 208 may effectively override the user interface-based settings menus to prevent unauthorized users from re-enabling the data capabilities that were disabled via a voice command by an unauthorized user.

Figure 6A:
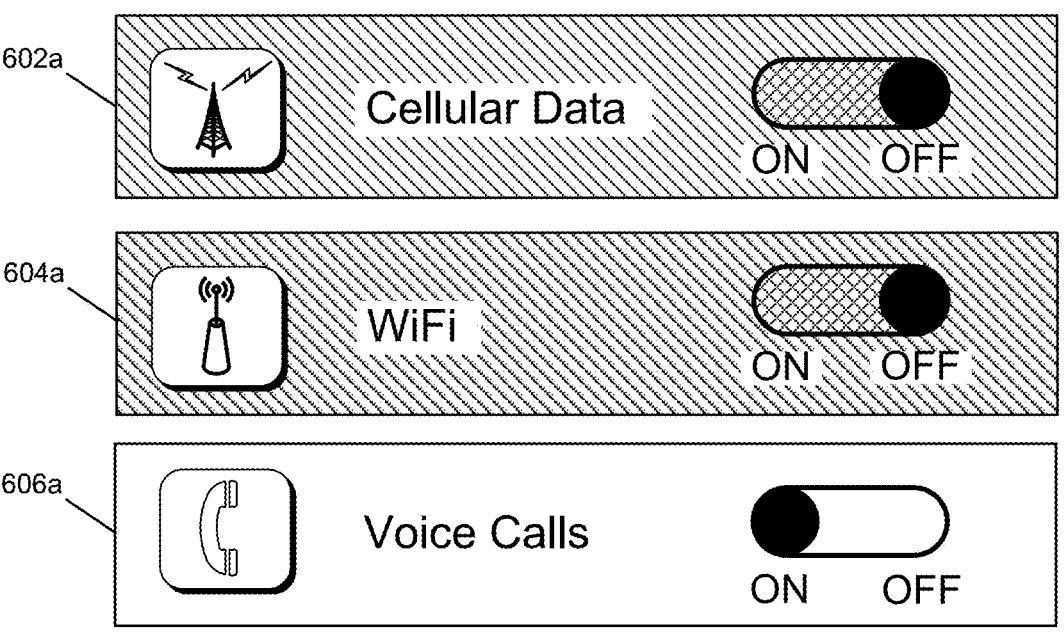
FIGS. 6A and 6B illustrate user interface controls within one or more various settings menus associated with the data capabilities on a wireless device, in accordance with certain techniques described herein.
Figure 6B:
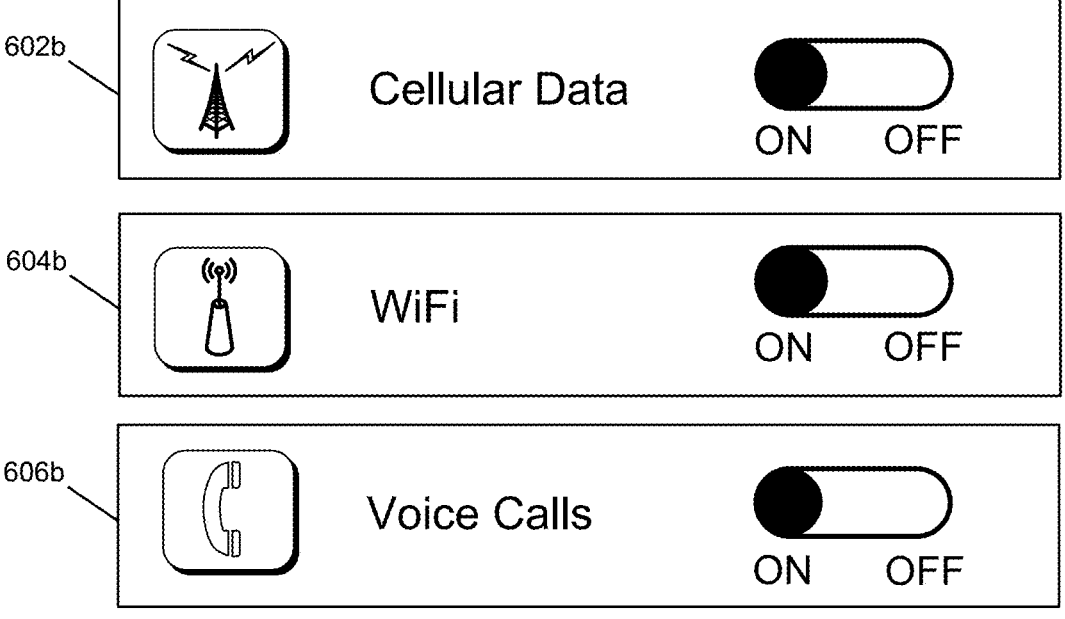

Referring briefly to FIGS. 6A and 6B, three examples are shown of user interface controls 602-606 associated with different data capabilities that may be enabled or disabled on the wireless device 110. In this example, a first control 602 within a settings menu of the wireless device 110 allows users to enable or disable cellular data capabilities on the wireless device 110. A second control 604, which may be within the same settings menu or a different settings menu, allows users to enable or disable the WiFi capabilities on the wireless device 110. A third control 606, which may be within the same settings menu(s) as controls 602 and/or 604 or a different settings menu, allows users to enable or disable the voice call capabilities on the wireless device 110. In some examples, the control 606 may be implemented as two separate controls within the settings menu of the wireless device 110, a control for cellular voice calls and a separate control for WiFi voice calls.

FIG. 6A may represent a state of the settings menus of the wireless device 110 after certain data capabilities have been disabled in operation 312. In this example, the data controller 208 has disabled the user control 602a associated with cellular data capabilities, has disabled the user control 604a associated with WiFi capabilities, and has enabled (or activated) the user control 606a associated with voice call capabilities. In contrast, FIG. 6B may represent the state of the settings menus of the wireless device 110 after the data capabilities have been re-enabled. In this example, the data controller 208 has re-enabled the user control 602b associated with cellular data capabilities, has re-enabled the user control 604b associated with WiFi capabilities, and has kept enabled (or confirmed activation of) the user control 606b associated with voice call capabilities.

As shown in FIGS. 6A and 6B, the data controller 208 may modify the settings menus 212 of the wireless device 110 to deactivate and gray-out the user controls 602a and 604a in response to a voice command disabling the corresponding data capabilities, and may reactivate the user controls 602b and 604b in response to a second voice command re-enabling these data capabilities. In various examples the data controller 208 may deactivate and gray-out the appropriate user controls, or may remove the user controls altogether from the settings menus 212 of the wireless device 110. Additionally or alternatively, the data controller 208 may modify the settings menus 212 to add a notification indicating to users that the corresponding data capabilities have been disabled and/or indicating which user(s) are authorized to re-enable the data capabilities.

Although user controls 602-606 are depicted together in FIGS. 6A and 6B, it should be understood that these different user controls may be implemented at different locations and/or different menus within the device settings menus 212

(e.g., application-specific settings menus, network settings menus, data usage settings menus, etc.). Additionally, although three user controls are shown in this example, relating to WiFi, cellular data, and voice call capabilities, it should be understood that the user controls modified in operation 312 may include greater or fewer user controls and may relate to any data capabilities described herein (e.g., Bluetooth capabilities, NFC capabilities, application-specific or feature-specific data capabilities, etc.).

Figure 7:
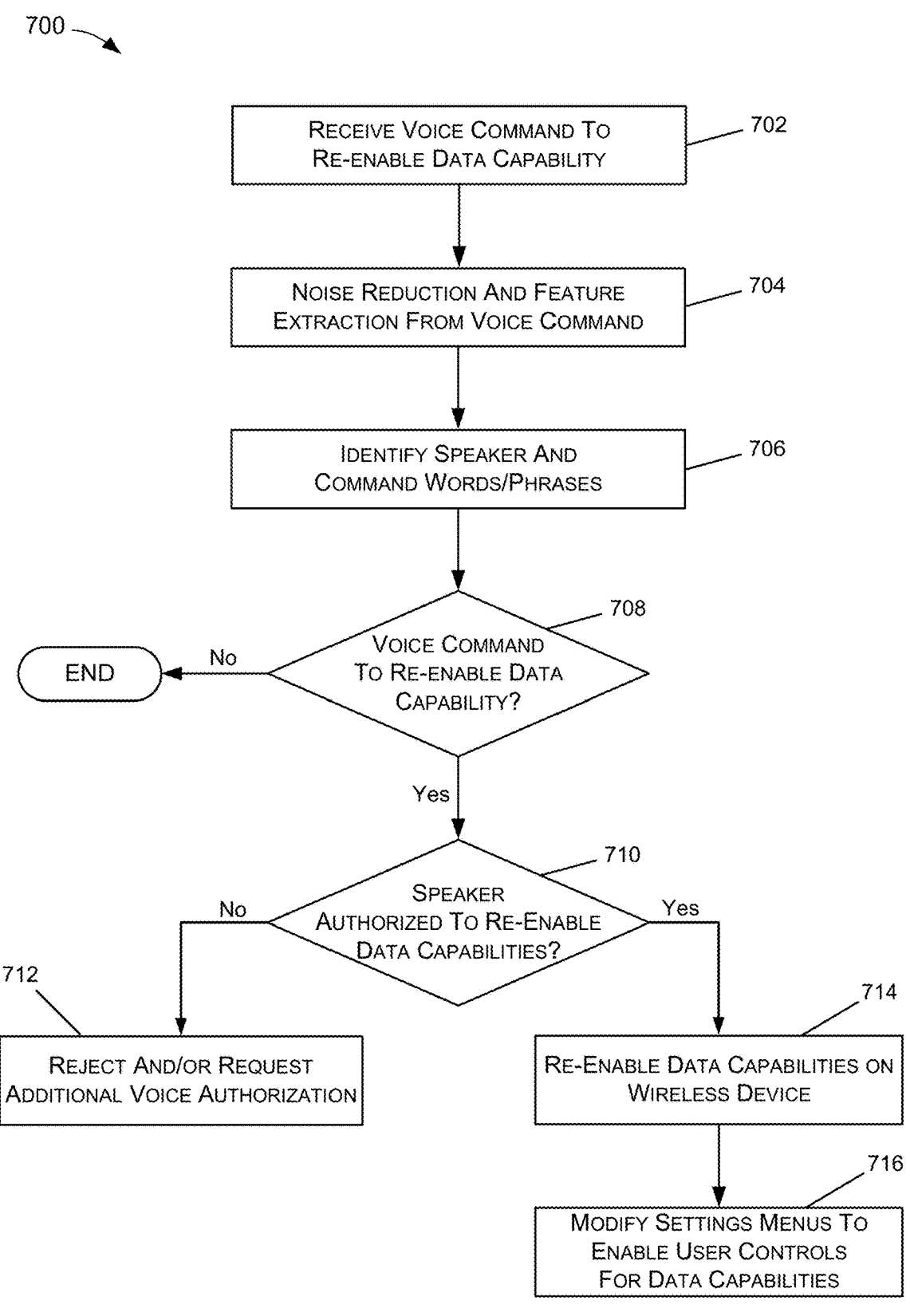
FIG. 7 is a flow diagram illustrating a process for re-enabling data capabilities based on a voice command received at a wireless device, in accordance with certain techniques described herein.

FIG. 7 is a flow diagram illustrating an example process 700 of re-enabling one or more data capabilities on a wireless device, based on an authorized voice command received at the wireless device. In some examples, process 700 may be related to process 300, and the operations of process 700 described below may be performed to re-enable the data capabilities disabled in process 300. Accordingly, the techniques performed during the operations of process 700 may be similar or identical to the techniques described above in reference to process 300. In some cases, process 700 may be performed by a data controller 208 executing within a wireless device 110, in response to a voice command received via an audio source input (e.g., microphone 214). In other examples, the operations described in process 700 may be performed within individual network interfaces and/or mobile applications executing on the wireless device 110, and/or other combinations of computing devices and components described herein.

Although process 700 describes an example in which voice commands are used to enable or re-enable data capabilities on the wireless device 110, in other examples other techniques may be used for enabling or re-enabling data capabilities. In some cases, if a voice command from an authorized user (e.g., a parent or employer) was previously used to disable data capabilities on the wireless device 110, then the credentials of that authorized user cannot be used to re-enable the data capabilities via the settings menu of the touch screen user interface. However, if the wireless device 110 is accessed using additional administrator credentials (e.g., an administrator passcode), then the disabled data capabilities may be re-enabled via the settings menu. Such features may provide advantages by allowing an administrator or other superseding user to re-enable data capabilities previously disabled via a voice commend from a different authorized user, or in instances when the authorized user loses his/her voice, for microphone failures on the wireless device 110, etc.

At operation 702, the data controller 208 receives a voice command to enable (or re-enable) one or more data capabilities on the wireless device 110. In some examples, operation 702 may be similar or identical to operation 302 discussed above. However, in operation 702 the voice command received via the microphone 214 (and/or any other audio inputs) may correspond to a command to enable (e.g., "Enable . . . ," "Enable Data," "Enable All Data," etc.) rather than to disable data capabilities on the wireless device 110. In some cases, voice command received at operation 702 also may specify the type(s) of data to be enabled (e.g., wireless network types, protocols, antennas, etc.), the individual features or applications on the wireless device 100 to which the enable data request applies, and/or the times, locations, or users associated with the enable data request, etc. As discussed above for operation 302, the voice command received in operation 302 also may include authorization-related data, such as the user's password, passcode, or a key phrase that the data controller 208 may verify to determine that the voice command is a valid and authentic command from an authorized user.

At operation 704, the data controller 208 may process the voice command received at operation 702 using various speech recognition and/or speaker recognition techniques. Operation 704 may be similar or identical to operation 304 in some examples. As discussed above in reference to operation 304, the data controller 208 may implement various speech recognition techniques in operation 704 via the speaker recognition component 216 and/or the command recognition component 218, including noise reduction and feature extraction processes to convert the voice command into a format where it can be analyzed and compared to voice command data (e.g., voiceprints) in the voice command repository 220.

At operation 706, the data controller 208 may identify the speaker and/or the specific words or phrases of the voice command received at operation 702. Operation 706 may be similar or identical to operation 306 in some examples. As discussed above, the text of the voice command received in operation 702 may be parsed and analyzed to determine the scope and specifics of the request to enable the data capabilities on the wireless device 110. The text of the voice command may include an instruction to enable (or re-enable) data capabilities on the wireless device 110, an enumeration of specific device features and/or applications for which data is to be re-enabled, an indication of the type(s) of data service to be enabled (e.g., WiFi, cellular data, Bluetooth, etc.), a time frame or time window for enabling the data capabilities, authorization data, etc. In some examples, operation 706 may include similar or identical speaker recognition techniques to those discussed above, performed by the data controller 208 to determine whether the voice command received at operation 702 was spoken by a known and authorized user 112.

At operation 708, the data controller 208 determines whether or not the voice command received at operation 702 corresponds to a request to re-enable one or more disabled data capabilities that were previously disabled on the wireless device 100. In some examples, operation 708 may include similar or identical techniques to those described above for operation 308. Initially, the data controller 208 may parse and analyze the text of the voice command identified in operation 706, to determine if the voice command is a request to enable one or more data capabilities on the wireless device 110. If the voice command received at operation 702 does not correspond to an enable data command (708:No), then process 700 may be terminated and no data capabilities are enabled (or re-enabled) on the wireless device 110.

If the voice command received at operation 702 corresponds to an enable data command, then the data controller 208 may determine if the data capabilities requested to be enabled are currently disabled on the wireless device 110. For instance, the data controller 208 may invoke internal interfaces/functions within the device applications/features 210, the device settings menus 212, and/or other internal network, device, and/or data management features of the wireless device 110, to determine the current enabled/disabled status of the requested data capabilities. Additionally or alternatively, the data controller 208 may retrieve data from the voice command repository 220 or other device storage including records of previous data disable voice commands, to determine whether the data capabilities are current enabled or disabled on the wireless device 110. If the voice command received at operation 702 is a request to enable data capabilities that are already enabled, then there are no data capabilities to be re-enabled on the wireless device 110 (708:No), and process 700 may be terminated.

However, if the voice command received at operation 702 corresponds to a request to enable data capabilities on the wireless device 110, and if the data controller 208 determines that those data capabilities are currently disabled (708:Yes), then process 700 may proceed to operation 710.

At operation 710, the data controller 208 determines whether or not the speaker/user 112 associated with the voice command is authorized to re-enable the requested data capabilities. As noted above, the data controller 208 may be configured to ensure that when an authorized user 112 (e.g., a parent, teacher, supervisor, etc.) disables certain data capabilities on the wireless device 110, the data capabilities cannot be re-enabled by an unauthorized user (e.g., a child, student, employee, etc.) who is subsequently in possession of the device. Accordingly, at operation 710, the data controller 208 may compare the speaker identified in operation 706 to a predetermined listing of speakers authorized to re-enable the requested data capabilities.

In various examples, the authorization processes of operation 710 may be similar or identical to those described above operation 308. As discussed above, the data controller 208 may access permissions data within the voice command repository 220 or other memory to determine whether the speaker/user identified in operation 706 is authorized to re-enable the requested data capabilities. The speaker/user 112 associated with the voice command may be identified based on speaker recognition techniques, and/or based on an authorization code (e.g., types or spoken password, passcode, or key phrase), biometric inputs, and/or other authorization techniques. In some implementations, device owners, administrators, and/or other authorized users 112 may have permissions to enable (or re-enable) all data capabilities on the wireless device 110 at any time, while other device users are not authorized to enable or re-enable any data capabilities via voice commands. In other examples, the data controller 208 may implement more granular control over the re-enabling data capabilities, in which certain users 112 may be authorized to re-enable specific data capabilities (e.g., particular wireless protocols/networks, particular applications/features, at particular locations, during particular time windows, etc.). In some examples, the re-enabling permissions for data capabilities may be voice command-specific, in which certain disable data commands are associated with specific, and/or may include time-based and location-based criteria for re-enabling data capabilities. In such cases, the data controller 208 may retrieve log data or data of records for the previous disable data commands, and may use determine which users are authorized to re-enable the data based on the previous disable data commands.

If the speaker/user 112 associated with the voice command received in operation 702 is not authorized to re-enable the requested data capabilities (710:No), then at operation 712 the data controller 208 may reject and/or request additional authorization before re-enabling the data capabilities requested in the voice command. In some examples, the data controller 208 may output a spoken response and/or a notification via the display screen 226, which may request a voiceprint authorization, biometric authorization, or a password or other authorization code before re-enabling the data capabilities. Additionally or alternatively, the data controller 208 may output the names of the user(s) that are authorized to re-enable the requested data capabilities, which may correspond to the user 112 that disabled the data capabilities via a previous voice command, and/or other authorized users designated to re-enable the data capabilities.

If the speaker/user 112 associated with the voice command received in operation 702 is authorized to re-enable the requested data capabilities (710:Yes), then at operation 714 the data controller 208 may re-enable the data capabilities requested in the voice command. In some examples, operation 714 may include similar or identical techniques for re-enabling data capabilities as those described above for disabling data capabilities in operation 310. For instance, the data controller 208 may invoke one or more APIs and/or other internal functions on the wireless device 110 to re-enable the requested data capabilities. Such API or internal functions may be associated with the wireless network management interface, an application management interface, a data management interface, and/or specific device features or applications installed on the device, based on the internal architecture of the wireless device 110.

At operation 716, the data controller 208 may modify the device settings menus 212 of the wireless device 110 to replace and/or enable the user controls within the settings menus associated with any data capabilities re-enabled in operation 714. In some examples, operation 716 may include similar or identical techniques for enabling user controls as those described above for disabling user controls in operation 312. For example, for each data capability re-enabled in operation 714, the data controller 208 may invoke an internal interface or function provided by the device settings menus 212 to enable or activate the corresponding user interface control within the device settings menus 212. In various examples, data controller 208 may invoke various interfaces or functions of application-specific settings menus, and/or device-level data usage menus, network settings menus, etc.

Although the above examples describe techniques for using authorized voice commands to disable and enable data capabilities on wireless device, similar or identical techniques may be used in other examples for gesture-based disabling and enabling of data capabilities. For instance, any or all of the above techniques involving voice commands from authorized users may be performed similarly or identically based on facial recognition and/or gestures from authorized users. Such gestures may be detected via the internal cameras, infrared sensors, and/or other input sensors on the wireless device 110, and specific gestures from authorized users may be associated with commands to disable and/or re-enable particular sets of data capabilities on the wireless device 110.

Figure 8:
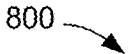
FIG. 8 is a block diagram illustrating various components of a wireless device, in which certain techniques described herein may be implemented.

FIG. 8 is a block diagram of an example architecture 800 of a wireless device 110 in accordance with various embodiments. In some implementations, wireless device 110 in FIG. 8 may correspond to the wireless devices 110 depicted in FIGS. 1 and 2. As shown in this example, the wireless device 110 may include one or more processors 802, which may include one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). Wireless device also may include one or more forms of computer-readable memory 204, and additional storage devices such as removable storage 804 and/or non-removable storage 806.

The wireless device 110 may further include one or more input devices 808, including, without limitation, a touch screen (e.g., touch, or proximity-based) display, physical buttons (e.g., keyboard or keypad), a camera-based sensor configured to receive gestural input from a user, a microphone or microphone array for receiving voice input commands from a user (e.g., microphone 214), pointing devices (e.g., mouse, pen, stylus, etc.), or any other suitable input devices 808 coupled communicatively to the processor(s) 802 and the computer-readable memory 204. The wireless device 110 also may include one or more output devices 810, including, without limitation, a display (e.g., display screen 226), speakers, a printer, or any other suitable output device coupled communicatively to the processor(s) 802 and the computer-readable memory 204.

Additionally, the wireless device 110 may include communications connection(s) 812 (e.g., network interfaces 202) that allow the wireless device 110 to communicate with various other computing devices 816, such as other wireless devices, web servers and/or application servers, via one or more communication networks 814. Communication networks 814 may include, for example, the WiFi network 114, cellular network 116, and/or various other communication networks (e.g., Bluetooth, NFC, satellite networks, etc.). The communications connection(s) 812 may facilitate transmitting and receiving wireless signals over any suitable wireless communications/data technology, standard, or protocol, as described above, such as using licensed, semi-licensed, or unlicensed spectrum over wireless and telecommunications networks. For example, the communication connection(s) 812 may include one or more of a wireless (e.g., IEEE 802.1x-based) interface (e.g., WiFi antenna 222), a cellular radio interface (e.g., cellular antenna 224), a Bluetooth interface and antenna, and so on.

In various embodiments, some or all of the computer-readable memory 204, removable storage 804, and non-removable storage 806 may comprise non-transitory computer-readable memory that generally includes both volatile memory and non-volatile memory (e.g., random access memory (RAM), read-only memory (ROM), erasable programmable read-only memory (EEPROM), flash memory, miniature hard drive, memory card, optical storage, magnetic cassettes, magnetic tape, magnetic disk storage or other magnetic storage devices, or any other medium). The computer-readable memory 204 also may be described as computer storage media and may include volatile and nonvolatile, removable and non-removable media implemented in any method or technology for storage of information, such as computer readable instructions, data structures, program modules, or other data. The computer-readable memory 204 may store include various types of instructions and data, such as an operating system 818 for the wireless device 110, device drivers, and various device applications implemented in software and/or firmware. The processor-executable instructions within the computer-readable memory 204 can be executed by the processors 802 to perform the various functions described herein. For instance, the computer-readable memory 204 may store a data controller 208, various device applications and features 210, a device settings menu 212, and/or a voice command repository 220 similar or identical to those described above in reference to FIG. 2.

Communication networks 814 may include one or more networks, such as a WiFi network 114 and a cellular network 116. WiFi networks 114 can include one or more core network(s) connected to terminal(s) via one or more access network(s). Example access networks may include LTE, WIFI, GSM Enhanced Data Rates for GSM Evolution (EDGE) Radio Access Network (GERAN), UTRAN, and other cellular access networks. Message transmission, reception, fallback, and deduplication can be performed, e.g., via 5G, 4G, LTE, 5G, WIFI, and/or other networks.

Cellular networks 116 can provide wide-area wireless coverage using one or more technologies such as GSM, Code Division Multiple Access (CDMA), UMTS, LTE, NR, or the like. Example communication networks 816 may include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the wireless device 110 and other computing devices 816 can additionally or alternatively be performed using other technologies, such as wired (Plain Old Telephone Service, POTS, or PSTN lines), optical (e.g., Synchronous Optical NETwork, SONET) technologies, and the like.

The communication networks 814 may include various types of networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. In various implementations, the cellular network 116 and/or the WiFi network 114 can carry voice or data. For example, the communication networks 814 can carry voice traffic using VoIP or other technologies as well as data traffic, and/or may carry data packets using HSPA, LTE, or other technologies as well as voice traffic. Some communication networks 814 may carry both data and voice in a PS format. For example, many LTE networks carry voice traffic in data packets according to the VoLTE standard.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed (or may be omitted entirely), and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:

receiving, by a wireless device, speech input of a speaker via a microphone of the wireless device;

determining, by the wireless device, that the speech input matches a single voice command associated with multiple operations, the determining being based on voice command data stored in internal storage of the wireless device; and executing the multiple operations on the wireless device, wherein executing the multiple operations comprises:

disabling a WiFi network data capability and a cellular network data capability, and disabling, within a settings menu of the wireless device, a user interface control for enabling and disabling the WiFi network data capability and the cellular network data capability by removing the user interface control from the settings menu, wherein the wireless device is configured such that voice call capabilities over a WiFi network and a cellular network and wireless emergency alert capabilities over the WiFi network and the cellular network are retained at a time when the WiFi network data capability and the cellular network data capability are disabled on the wireless device, and wherein the speech input further specifies one or more authorized users different from the speaker to re-enable the WiFi network data capability and the cellular network data capability, and the wireless device conditions the re-enabling on authenticating one of the one or more authorized users with the wireless device.

2. The method of claim 1, further comprising:

determining, based on the speech input, a first feature or application on the wireless device, wherein disabling the WiFi network data capability and the cellular network data capability comprises:

disabling the WiFi network data capability and the cellular network data capability for the first feature or application, and configuring the wireless device to retain the WiFi network data capability and the cellular network data capability for a second feature or application on the wireless device different from the first feature or application.

3. The method of claim 1, further comprising:

retrieving a plurality of voice commands represented in the voice command data stored in internal storage of the wireless device;

comparing the speech input to each of the plurality of voice commands; and selecting a matching voice command corresponding to the speech input.

4. The method of claim 1, wherein determining that the speech input matches the single voice command comprises:

determining the speaker associated with the speech input;

determining a key phrase corresponding to the speech input; and comparing the speaker and key phrase to the voice command data.

5. The method of claim 1, further comprising:

receiving a second speech input via the microphone of the wireless device;

comparing the second speech input to the voice command data; and executing second operations on the wireless device based on a determination that the second speech input corresponds to a voice command in the voice command data, wherein executing the second operation comprises:

enabling at least one data capability of the wireless device, and enabling, within the settings menu of the wireless device, the user interface control for enabling and disabling the at least one data capability.

6. The method of claim 1, wherein disabling the user interface control includes:

freezing the user interface control associated with enabling and disabling the WiFi network data capability and the cellular network data capability within the settings menu.

7. A wireless computing device comprising:

one or more radio frequency transceivers configured to receive and transmit data via a wireless communication network;

an audio input component;

one or more processors; and memory storing executable instructions that, when executed by the one or more processors, cause the one or more processors to perform operations comprising:

receiving a speech input of a speaker via the audio input component;

determining that the speech input matches a single voice command associated with multiple operations, the determining being based on voice command data stored in internal storage of the wireless computing device; and in response to determining that the speech input matches the single voice command:

disabling a WiFi network data capability of the wireless computing device and a cellular network data capability of the wireless computing device; and disabling a user interface control of a user interface menu of the wireless computing device for enabling and disabling the WiFi network data capability and the cellular network data capability by removing the user interface control from the user interface menu, wherein the wireless computing device is configured such that voice call capabilities over a WiFi network and a cellular network and wireless emergency alert capabilities over the WiFi network and the cellular network are retained at a time when the WiFi network data capability and the cellular network data capability are disabled on the wireless computing device, and wherein the speech input further specifies one or more authorized users different from the speaker to re-enable the WiFi network data capability and the cellular network data capability, and the wireless computing device conditions the re-enabling on authenticating one of the one or more users different from the speaker with the wireless computing device.

8. The wireless computing device of claim 7, wherein the operations further comprise:

determining, based on the speech input, a first feature or application on the wireless computing device, wherein disabling the WiFi network data capability and the cellular network data capability comprises:

disabling the WiFi network data capability and the cellular network data capability for the first feature or application, and configuring the wireless computing device to retain the WiFi network data capability and the cellular network data capability for a second feature or application on the wireless computing device different from the first feature or application.

9. The wireless computing device of claim 7, wherein the operations further comprise:

retrieving a plurality of voice commands represented in the voice command data stored in the memory of the wireless computing device;

comparing the speech input to each of the plurality of voice commands; and selecting a matching voice command corresponding to the speech input.

10. The wireless computing device of claim 7, wherein determining that the speech input matches the single voice command comprises:

determining the speaker associated with the speech input;

determining a key phrase corresponding to the speech input; and comparing the speaker and key phrase to the voice command data.

11. The wireless computing device of claim 7, wherein operations further comprise:

receiving a second speech input via the audio input component;

comparing the second speech input to the voice command data; and in response to determining that the second speech input matches a voice command in the voice command data:

enabling at least one data capability of the wireless computing device; and enabling the user interface control for enabling and disabling the at least one data capability.

12. The wireless computing device of claim 7, wherein disabling the user interface control includes:

freezing the user interface control associated with enabling and disabling the WiFi network data capability and the cellular network data capability within the user interface menu.

13. One or more non-transitory computer-readable media storing instructions that, when executed, cause one or more processors to perform acts comprising:

receiving a speech input of a speaker via a microphone of a wireless device;

determining, by the wireless device, that the speech input matches a single voice command associated with multiple operations, the determining being based on voice command data stored in internal storage of the wireless device; and executing the multiple operations on the wireless device, wherein the multiple operations comprise:

disabling a WiFi network data capability and a cellular network data capability; and disabling, within a settings menu of the wireless device, a user interface control for enabling and disabling the WiFi network data capability and the cellular network data capability by removing the user interface control from the settings menu, wherein the wireless device is configured such that voice call capabilities over a WiFi network and a cellular network and wireless emergency alert capabilities over the WiFi network and the cellular network are retained at a time when the WiFi network data capability and the cellular network data capability are disabled on the wireless device, and wherein the speech input further specifies one or more authorized users different from the speaker re-enable the WiFi network data capability and the cellular network data capability, and the wireless device conditions the re-enabling on authenticating one of the one or more authorized users with the wireless device.

14. The non-transitory computer-readable media of claim 13, wherein the acts further comprise:

determining, based on the speech input, a first feature or application on the wireless device, wherein disabling the WiFi network data capability of the wireless device and the cellular network data capability of the wireless device comprises:

disabling the WiFi network data capability and the cellular network data capability for the first feature or application, and configuring the wireless device to retain the WiFi network data capability and the cellular network data capability for a second feature or application on the wireless device different from the first feature or application.

15. The non-transitory computer-readable media of claim 13, wherein the acts further comprise:

retrieving a plurality of voice commands represented in voice command data stored in internal storage of the wireless device;

comparing the speech input to each of the plurality of voice commands; and selecting a matching voice command corresponding to the speech input.

16. The non-transitory computer-readable media of claim 13, wherein the multiple operations comprise:

determining the speaker associated with the speech input;

determining a key phrase corresponding to the speech input; and comparing the speaker and key phrase to the voice command data.

17. The one or more non-transitory computer-readable media of claim 13, wherein disabling the user interface control includes:

freezing the user interface control associated with enabling and disabling the WiFi network data capability and the cellular network data capability within the settings menu.

* * * * *